United States Patent
Mitani et al.

(10) Patent No.: US 11,176,073 B2
(45) Date of Patent: Nov. 16, 2021

(54) DATA PROCESSING APPARATUS

(71) Applicant: Oki Data Corporation, Tokyo (JP)

(72) Inventors: Syuhei Mitani, Tokyo (JP); Akira Nakayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 16/993,706

(22) Filed: Aug. 14, 2020

(65) Prior Publication Data
US 2021/0064559 A1 Mar. 4, 2021

(30) Foreign Application Priority Data
Aug. 27, 2019 (JP) .............................. JP2019-154936

(51) Int. Cl.
G06F 13/00 (2006.01)
G06F 13/40 (2006.01)
G06F 1/3215 (2019.01)
G06F 1/3209 (2019.01)

(52) U.S. Cl.
CPC ........ *G06F 13/4022* (2013.01); *G06F 1/3209* (2013.01); *G06F 1/3215* (2013.01); *G06F 2213/3808* (2013.01)

(58) Field of Classification Search
CPC .... G06F 13/00; G06F 13/4022; G06F 1/3209; G06F 1/3215; G06F 2213/3808
See application file for complete search history.

(56) References Cited

U.S. PATENT DOCUMENTS 5,901,292 A * 5/1999 Nishigaki ........... G06F 13/4022
710/304
2017/0371398 A1* 12/2017 Umimura ........... H04N 1/00891

FOREIGN PATENT DOCUMENTS

JP 2010-055265 A 3/2010

* cited by examiner

*Primary Examiner* — Tim T Vo
*Assistant Examiner* — Kim T Huynh
(74) *Attorney, Agent, or Firm* — Rabin & Berdo, P.C.

(57) ABSTRACT

A data processing apparatus includes a power-source controller, a data processing device, a physical-layer section, a communication controller, and a state controller. The power-source controller controls a first power-source setting and a second power-source setting. The second power-source setting causes less electric power consumption than the first power-source setting. The communication controller performs the communication with the data processing device through a predetermined communication path and the physical-layer section under the first power-source setting. The communication controller stops the communication with the data processing device through the communication path and the physical-layer section under the second power-source setting. The state controller maintains the second communication state with respect to the data processing device side of the communication path while electric power supply to the physical-layer section is reduced under the second power-source setting.

8 Claims, 8 Drawing Sheets

DATA PROCESSING APPARATUS

CROSS REFERENCE TO RELATED APPLICATIONS

The present application claims priority from Japanese Patent Application No. 2019-154936 filed on Aug. 27, 2019, the entire contents of which are hereby incorporated by reference.

BACKGROUND

The technology relates to a data processing apparatus.

It has been desired to reduce electric power consumption of an apparatus in a standby state. For example, in order to reduce the electric power consumption of the apparatus in the standby state, Japanese Unexamined Patent Application Publication (JP-A) No. 2010-055265 discloses a proposition to deactivate a power source of a device controller while the apparatus is in a suspended state.

SUMMARY

Recently, it is desired to further reduce electric power consumption in a standby state.

It is desirable to provide a data processing apparatus that makes it possible to further reduce electric power consumption in a standby state.

According to one embodiment of the technology, there is provided a data processing apparatus that includes a power-source controller, a data processing device, a physical-layer section, a communication controller, and a state controller. The power-source controller controls a first power-source setting and a second power-source setting. The second power-source setting causes less electric power consumption than the first power-source setting. The physical-layer section is brought to a first communication state when communication with the data processing device is performed under the first power-source setting. The physical-layer section is brought to a second communication state before switching from the first power-source setting to the second power-source setting is performed. The second communication state causes the communication with the data processing device to be stopped. The communication controller performs the communication with the data processing device through a predetermined communication path and the physical-layer section under the first power-source setting. The communication controller stops the communication with the data processing device through the communication path and the physical-layer section under the second power-source setting. The state controller maintains the second communication state with respect to the data processing device side of the communication path while electric power supply to the physical-layer section is reduced under the second power-source setting.

According to one embodiment of the technology, there is provided a data processing apparatus that includes a power-source controller, a physical-layer section, a communication controller, and a state controller. The power-source controller controls a first power-source setting and a second power-source setting. The second power-source setting causes less electric power consumption than the first power-source setting. The physical-layer section is brought to a first communication state when communication with a data processing device is performed under the first power-source setting. The physical-layer section is brought to a second communication state before switching from the first power-source setting to the second power-source setting is performed. The second communication state causes the communication with the data processing device to be stopped. The communication controller performs the communication with the data processing device through a predetermined communication path and the physical-layer section under the first power-source setting. The communication controller stops the communication with the data processing device through the communication path and the physical-layer section under the second power-source setting. The state controller maintains the second communication state with respect to the data processing device side of the communication path while electric power supply to the physical-layer section is reduced under the second power-source setting.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
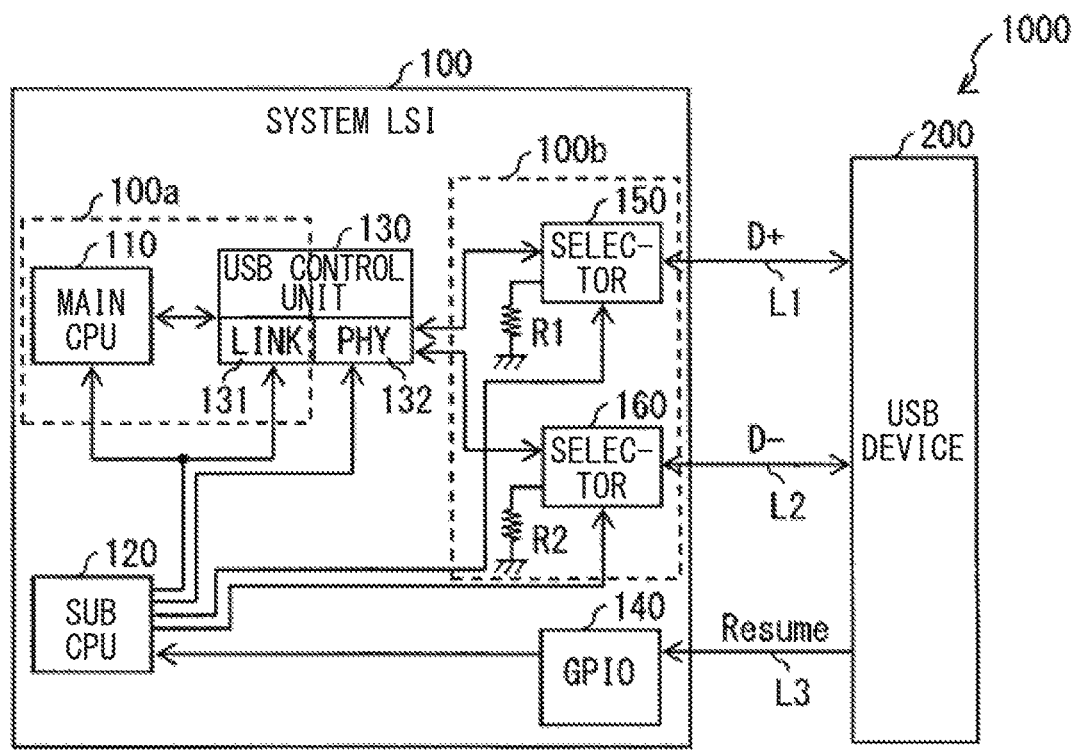
FIG. 1 is a diagram illustrating an example of a schematic configuration of a data processing apparatus according to one example embodiment of the technology.

Hereinafter, some example embodiments of the technology will be described in detail with reference to the drawings. Note that the following description is directed to illustrative examples of the technology and not to be construed as limiting to the technology. Factors including, without limitation, dimensions, dimension ratios, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail. The description will be given in the following order.
1. Background and Issue of Technology
2. Example Embodiment (Data Processing Apparatus)
3. Modifications (Data Processing Apparatuses)
4. Application Example (Image Forming Apparatus)

1. Background and Issue of Technology

It has been desired to reduce electric power consumption of an apparatus in a standby state. For example, in order to reduce the electric power consumption of the apparatus in the standby state, JP-A No. 2010-055265 proposes to deactivate a power source of a device controller while a USB (Universal Serial Bus) suspend mode is enabled. The USB suspend mode refers to a mode in which data lines of the USB are maintained in a J-state, i.e., part of operation of an apparatus is temporarily suspended while an operation state of data or a program is maintained, in order to reduce the electric power consumption. In a method disclosed in JP-A No. 2010-055265, however, it is not possible to deactivate a power source of a physical layer (PHY) circuit that performs reception and transmission of a differential signal for the following two reasons.

First Reason

In order to enable the USB suspend mode, it may be necessary to maintain voltage levels of the data lines of the USB at appropriate voltage values. However, when the power source of the PHY circuit is deactivated, the voltage levels of the data lines of the USB become unstable, making it difficult to maintain the USB suspend mode. This is a first reason.

Second Reason

When the power source of the PHY circuit is deactivated, it may not be possible to detect the voltage levels of the data lines of the USB. This may make it difficult to respond to a resume signal supplied from a connected device, preventing a return from the USB suspend mode. This is a second reason.

The PHY circuit includes a plurality of drivers and a plurality of receivers that receive and transmit differential signals. Accordingly, the PHY circuit consumes more electric power than a typical single-ended input-output (IO) terminal. Therefore, there is a need to also deactivate the power source of the PHY circuit in addition to the power source of the device controller. To address the need, a description is given below of an example embodiment of the technology that is configured to deactivate the power source of the PHY circuit in addition to the power source of the device controller.

2. Example Embodiment

Configuration

FIG. 1 illustrates an example of a schematic configuration of a data processing apparatus 1000 according to an example embodiment of the technology. The data processing apparatus 1000 may correspond to a "data processing apparatus" in one specific but non-limiting embodiment of the technology. The data processing apparatus 1000 may serve as a USB interface unit to be provided in an information processing apparatus such as a personal computer or a smartphone, or in an image forming apparatus such as a printer, a scanner, or a multi-function peripheral.

The data processing apparatus 1000 may include, for example but not limited to, a system large scale integration (LSI) 100 and a USB device 200. The USB device 200 may correspond to a "data processing device" in one specific but non-limiting embodiment of the technology. The USB device 200 may include, for example, a module that performs reception and transmission of data with an external device. Non-limiting examples of such a module may include a wireless local area network (LAN) module.

The system LSI 100 and the USB device 200 may be coupled to each other by data lines (i.e., a D+ line L1 and a D− line L2) of the USB and a resume line (i.e., a resume signal line L3) of the USB. The data lines (i.e., the D+ line L1 and the D− line L2) of the USB may correspond to a "predetermined communication path" in one specific but non-limiting embodiment of the technology. The system LSI 100 and the USB device 200 may receive a packet of USB communication from each other or transmit a packet of USB communication to each other through the data lines of the USB, for example. The USB device 200 may transmit a resume signal to the system LSI 100 through the resume line (i.e., the resume signal line L3), for example.

According to the example embodiment, the resume signal may be transmitted from the USB device 200 to the system LSI 100 through the resume signal line L3 in a case where resumption of the USB communication is requested while the USB suspend mode is enabled. The resume signal at a high level may indicate that a resume request is being made, and the resume signal at a low level may indicate that the resume request is not being made.

The system LSI 100 may include, for example but not limited to, a main central processing unit (CPU) 110, a sub CPU 120, a USB control unit 130, a general-purpose input-output (GPIO) 140, a selector 150, a selector 160, a pull-down resistor R1, and a pull-down resistor R2. The USB control unit 130 may include a LINK circuit 131 and a PHY circuit 132. A circuit including the main CPU 110 and the LINK circuit 131 may serve as a controller 100*a* that controls the PHY circuit 132. A circuit including the selectors 150 and 160 and the pull-down resistors R1 and R2 may serve as a state controller 100*b* that controls a state of each of the data lines of the USB.

The sub CPU 120 may correspond to a "power-source controller" in one specific but non-limiting embodiment of the technology. The PHY circuit 132 may correspond to a "physical-layer section" in one specific but non-limiting embodiment of the technology. The GPIO 140 may correspond to a "state-signal input section" in one specific but non-limiting embodiment of the technology. The circuit including the selectors 150 and 160 and the pull-down resistors R1 and R2 may correspond to a "state controller" in one specific but non-limiting embodiment of the technology. The selectors 150 and 160 may correspond to a "switch section" in one specific but non-limiting embodiment of the technology. The pull-down resistors R1 and R2 may correspond to a "resistor" in one specific but non-limiting embodiment of the technology. The controller 100a may correspond to a "communication controller" in one specific but non-limiting embodiment of the technology. The state controller 100b may correspond to a "state controller" in one specific but non-limiting embodiment of the technology.

The controller 100a may perform communication with the USB device 200 through the data lines of the USB and the PHY circuit 132. The controller 100a may perform the communication with the USB device 200 through the data lines of the USB and the PHY circuit 132, for example, under a power-source setting A in which the controller 100a and the PHY circuit 132 operate normally. The power-source setting A may correspond to a "first power-source setting" in one specific but non-limiting embodiment of the technology. The controller 100a may stop the communication with the USB device 200 through the data lines of the USB and the PHY circuit 132, for example, under a power-source setting B that causes less electric power consumption than the power-source setting A. The power-source setting B may correspond to a "second power-source setting" in one specific but non-limiting embodiment of the technology. The power-source setting B may cause a power source to be turned off, for example. For example, when the communication with the USB device 200 is performed under the power-source setting A, the controller 100a may so control the PHY circuit 132 that the PHY circuit 132 is brought to a USB active state. The USB active state may correspond to a "first communication state" in one specific but non-limiting embodiment of the technology. For example, when the communication with the USB device 200 is stopped before switching from the power-source setting A to the power-source setting B is performed, the controller 100a may so control the PHY circuit 132 that the PHY circuit 132 is brought to a USB suspend state. The USB suspend state may correspond to a "second communication state" in one specific but non-limiting embodiment of the technology. When switching from the power-source setting B to the power-source setting A is performed, the controller 100a may so control the PHY circuit 132 that the PHY circuit 132 is brought to the USB suspend state. The controller 100a may cause the GPIO 140 to perform switching from a state under the power-source setting B to a state under the power-source setting A, and thereafter, perform the communication with the USB device 200 through the data lines of the USB and the PHY circuit 132 under the power-source setting A.

The sub CPU 120 may perform selection control of the selectors 150 and 160 and power source control of the controller 100a and the PHY circuit 132 on the basis of control performed by the controller 100a. In one specific but non-limiting example, the sub CPU 120 may supply, to the selector 150, a control signal that causes switching from coupling between the data line of the USB and the PHY circuit 132 to coupling between the data line of the USB and the pull-down resistor R1 to be performed. The sub CPU 120 may supply such a control signal to the selector 150 on the basis of the control performed by the controller 100a. Further, the sub CPU 120 may supply, to the selector 160, a control signal that causes switching from coupling between the data line of the USB and the PHY circuit 132 to coupling between the data line of the USB and the pull-down resistor R2 to be performed. The sub CPU 120 may supply such a control signal to the selector 160, on the basis of the control performed by the controller 100a. For example, after the switching to the coupling between the data lines of the USB and the respective pull-down resistors R1 and R2 is performed, the sub CPU 120 may reduce electric power supply to the PHY circuit 132 as the power-source setting B.

The sub CPU 120 may perform the selection control of the selectors 150 and 160 and the power source control of the controller 100a and the PHY circuit 132 on the basis of a resume signal received through the GPIO 140 while the USB suspend mode is enabled. In one specific but non-limiting example, the sub CPU 120 may be configured to control the power-source setting A and the power-source setting B as a power-source setting of the controller 100a and the PHY circuit 132 on the basis of the resume signal received by means of the GPIO 140 while the USB suspend mode is enabled.

For example, when the resume signal, which is received while the USB suspend mode is enabled, is at a high level, the sub CPU 120 may consider the reception of the high-level resume signal as that a resume request is being made, and may supply a control signal corresponding to the power-source setting A to the power source of the controller 100a and the PHY circuit 132. Upon receiving the control signal corresponding to the power-source setting A, the power source of the controller 100a and the PHY circuit 132 may start supplying, to the controller 100a and the PHY circuit 132, electric power that allows the controller 100a and the PHY circuit 132 to operate normally.

For example, when the resume signal, which is received while the USB suspend mode is enabled, is at a low level, the sub CPU 120 may consider the reception of the low-level resume signal as that the resume request is not being made, and may supply a control signal corresponding to the power-source setting B to the power source of the controller 100a and the PHY circuit 132. While receiving the control signal corresponding to the power-source setting B, the power source of the controller 100a and the PHY circuit 132 may supply, to the controller 100a and the PHY circuit 132, electric power (e.g., no electric power) that is less than electric power consumed under the power-source setting A.

When the communication with the USB device 200 is performed under the power-source setting A, the PHY circuit 132 may be brought to the USB active state by the control performed by the controller 100a. Further, the PHY circuit 132 may be brought to a USB suspend state, by the control performed by the controller 100a, before switching from the power-source setting A to the power-source setting B is performed. The USB suspend state may cause the communication with the USB device 200 to be stopped. Further, the PHY circuit 132 may be brought to the USB suspend state again by the control performed by the controller 100a, when switching from the power-source setting B to the power-source setting A is performed.

Figure 2:
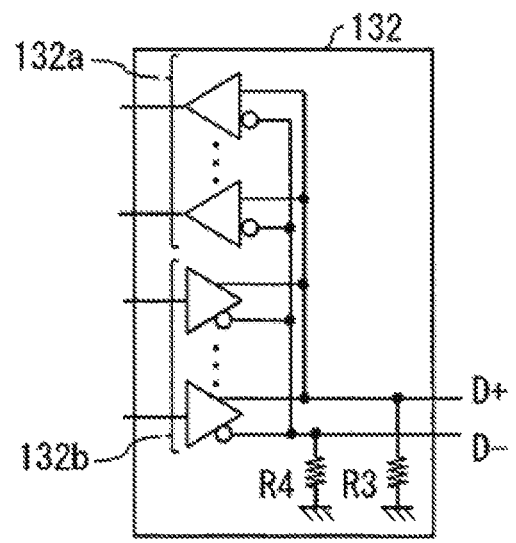
FIG. 2 is a diagram illustrating an example of a circuit configuration of a PHY circuit.

As illustrated in FIGS. 1 and 2, for example, the PHY circuit 132 may include a differential-signal receiver group 132a. The differential-signal receiver group 132a may detect voltage levels of the respective data lines of the USB through the selectors 150 and 160. The PHY circuit 132 may further include a differential-signal receiver group 132b, as illustrated in FIGS. 1 and 2, for example. The differential-signal receiver group 132b may apply predetermined voltages to the respective data lines of the USB through the selectors 150 and 160. The PHY circuit 132 may further include a pull-down resistor R3 and a pull-down resistor R4, as illustrated in FIGS. 1 and 2, for example. The pull-down resistors R3 and R4 may be coupled to the respective data lines of the USB. For example, when the PHY circuit 132 is brought to the USB active state by the control performed by the controller 100*a*, the PHY circuit 132 may cause the differential-signal receiver group 132*a* to detect the voltage levels of the respective data lines of the USB, and may supply the detected voltage levels to the LINK circuit 131.

When it is required for the USB device 200 to perform a communication with the system LSI 100 in a case where the USB suspend mode is enabled under the power-source setting B, the GPIO 140 may perform switching from the state under the power-source setting B to the state under the power-source setting A. When the GPIO 140 receives the resume signal indicating that the resume request is being made (e.g., the high-level resume signal) in a case where the USB suspend mode is enabled under the power-source setting B, the GPIO 140 may supply the received resume signal to the sub CPU 120. On this occasion, when the sub CPU 120 receives the resume signal indicating that the resume request is being made, the sub CPU 120 may switch the control signal that is being supplied to the power source of the controller 100*a* and the PHY circuit 132 from the control signal corresponding to the power-source setting B to the control signal corresponding to the power-source setting A. Upon receiving the control signal corresponding to the power-source setting A instead of the control signal corresponding to the power-source setting B, the power source of the controller 100*a* and the PHY circuit 132 may start supplying, to the controller 100*a* and the PHY circuit 132, electric power that allows the controller 100*a* and the PHY circuit 132 to operate normally. On this occasion, the PHY circuit 132 may be set again to the USB suspend state in accordance with the electric power supply. The GPIO 140 may thus cause the controller 100*a* and the PHY circuit 132 to undergo switching from the state under the power-source setting B to the state under the power-source setting A by supplying, to the sub CPU 120, the resume signal indicating that the resume request is being made.

The state controller 100*b* may maintain the USB suspend state with respect to the USB device 200 side of the data lines of the USB while the electric power supply to the PHY circuit 132 is reduced on the basis of the power-source setting B. After the PHY circuit 132 is brought to the USB suspend state, the selectors 150 and 160 may perform switching from the coupling between the data lines of the USB, and the PHY circuit 132 to the coupling between the data lines of the USB and the pull-down resistors R1 and R2, respectively. After the sub CPU 120 performs switching from the power-source setting B to the power-source setting A and the PHY circuit 132 is brought to the USB suspend state, the selectors 150 and 160 may perform switching from the coupling between the data lines of the USB and the pull-down resistors R1 and R2 to the coupling between the data lines of the USB and the PHY circuit 132, respectively. As a result, the communication state of the data lines of the USB and the communication state of the PHY circuit 132 may become the same as each other, i.e., the USB suspend state. That is, the state controller 100*b* may cause the data lines of the USB to be in the communication state the same as that of the PHY circuit 132, i.e., the USB suspend state, after the switching from the power-source setting B to the power-source setting A is performed and the PHY circuit 132 is brought to the USB suspend state.

The selector 150 may be configured to selectively couple the pull-down resistor R1 and the PHY circuit 132 to the data line of the USB. The selector 160 may be configured to selectively couple the pull-down resistor R2 and the PHY circuit 132 to the data line of the USB. The selector 150 may be a switch module that selects one of the PHY circuit 132 and the pull-down resistor R1 as a coupling target of the D+ line L1 of the data lines of the USB. The selector 160 may be a switch module that selects one of the PHY circuit 132 and the pull-down resistor R2 as a coupling target of the D− line L2 of the data lines of the USB.

The pull-down resistors R1 and R2 may each provide a predetermined resistance component. The pull-down resistors R1 and R2 may each be a resistance element having a resistance value of 125 kΩ, for example. The pull-down resistor R1 may have one terminal that is coupled to the selector 150 and the other terminal coupled to a constant voltage line (e.g., a ground line). The pull-down resistor R2 may have one terminal that is coupled to the selector 160 and the other terminal coupled to a constant voltage line (e.g., a ground line).

Figure 3:
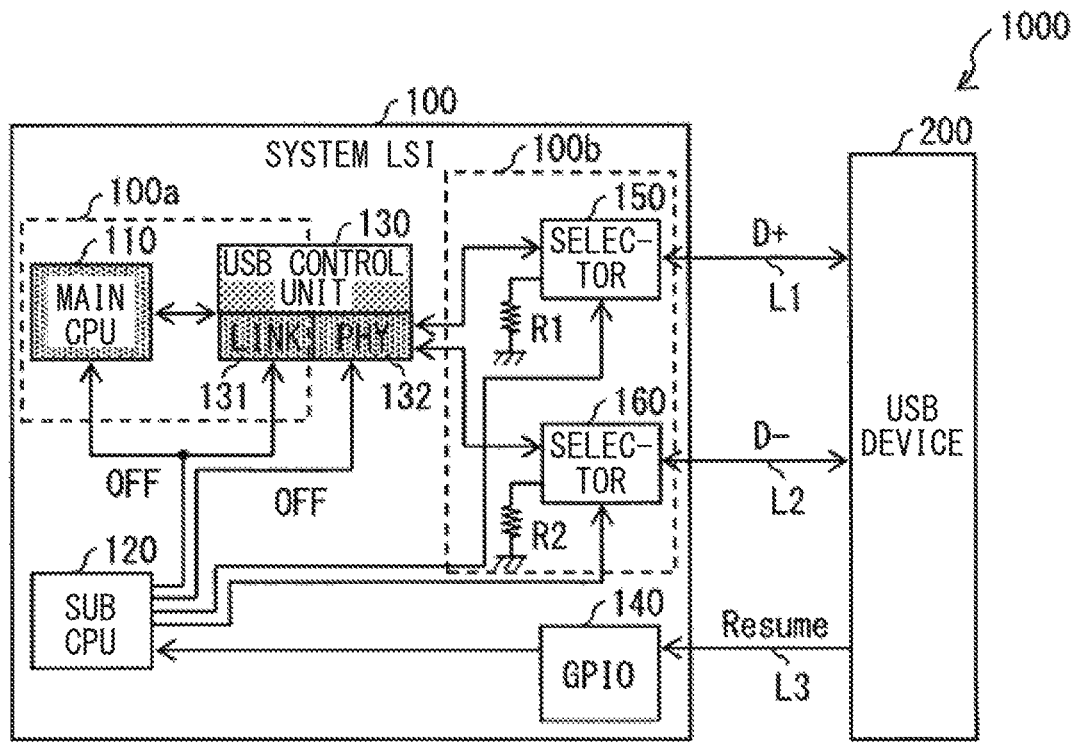
FIG. 3 is a diagram illustrating an example of a state of a circuit in a case where a USB suspend mode is enabled.
Figure 4:
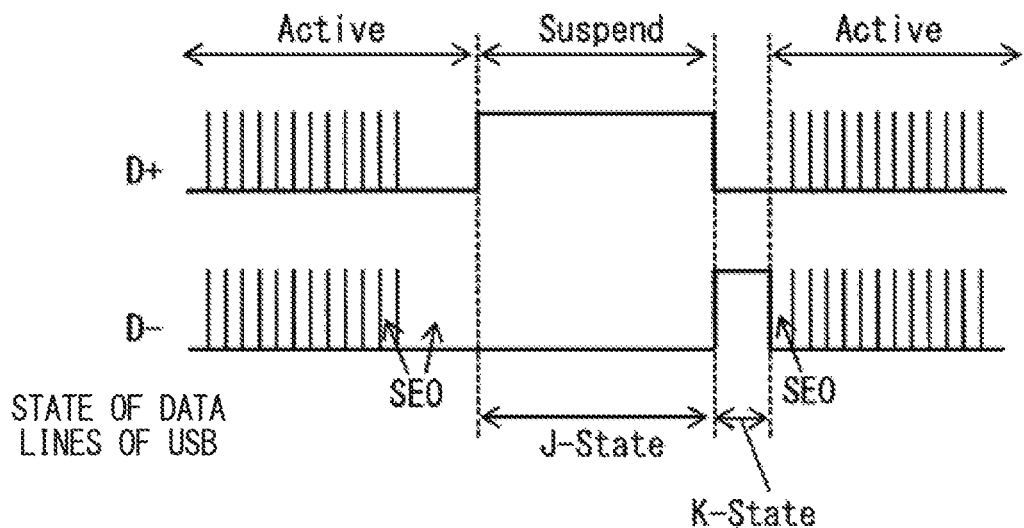
FIG. 4 is a diagram illustrating an example of transition of waveforms in data transmission.

FIG. 3 illustrates an example of a circuit state of the data processing apparatus 1000 in a case where the USB suspend mode is enabled. FIG. 4 illustrates an example of transition of waveforms in data transmission of the data processing apparatus 1000.

The USB active state may refer to a state in which the USB device 200 transfers a packet of the USB communication to the system LSI 100. Note that, when the packet of the USB communication is not transferred in the USB active state, the D+ line L1 and the D− line L2 of the data lines of the USB may both have the low signal levels. The state of the data lines of the USB at this time may be referred to as a single ended zero (SE0) state.

The USB suspend state may refer to a state in which the USB device 200 maintains the data lines of the USB in the J-state. When the PHY circuit 132 is in the USB suspend state, the USB device 200 may supply the high-level signal to the D+ line L1 of the data lines of the USB, and may supply the low-level signal to the D− line L2 of the data lines of the USB. When the signal level of the D+ line L1 is set to the high level and the signal level of the D− line L2 is set to the low level in the data lines of the USB, the state of the data lines of the USB may be referred to as the J-state.

In a case where resumption of the USB communication is requested while the USB suspend mode is enabled, the USB device 200 may supply the resume signal to the system LSI 100 through the resume signal line L3. The USB device 200 may supply the resume signal to the GPIO 140. Substantially at the same time, the USB device 200 may supply the low-level signal to the D+ line L1 of the data lines of the USB, and may supply the high-level signal to the D− line L2 of the data lines of the USB. This may bring the data lines of the USB to a K-state.

According to the example embodiment, upon receiving the resume signal through the GPIO 140, the sub CPU 120 may be configured to control, on the basis of the received resume signal, the power-source setting (the first power-source setting) that allows the controller 100*a* and the PHY circuit 132 to operate normally and the power-source setting (the second power-source setting) that causes less electric power consumption than the first power-source setting. In one specific but non-limiting example, upon receiving the resume signal through the GPIO 140, the sub CPU 120 may activate (turn on) the power source of the controller 100*a* and the PHY circuit 132 or deactivate (turn off) the power source of the controller 100*a* and the PHY circuit 132, on the basis of the received resume signal. Therefore, while the USB suspend mode is enabled, the PHY circuit 132 may not be able to detect the voltage levels of the data lines of the USB through the selectors 150 and 160. To address this, according to the example embodiment, the resume signal line L3 may be provided between the system LSI 100 and the USB device 200 in addition to the data lines of the USB.

The resume signal may be supplied from the USB device 200 to the system LSI 100 through the resume signal line L3, thereby notifying the system LSI 100 that the data lines of the USB are in the K-state. In the following, a detailed description is given of a procedure of data transmission between the system LSI 100 and the USB device 200.

Data Transmission Procedure

Figure 5:
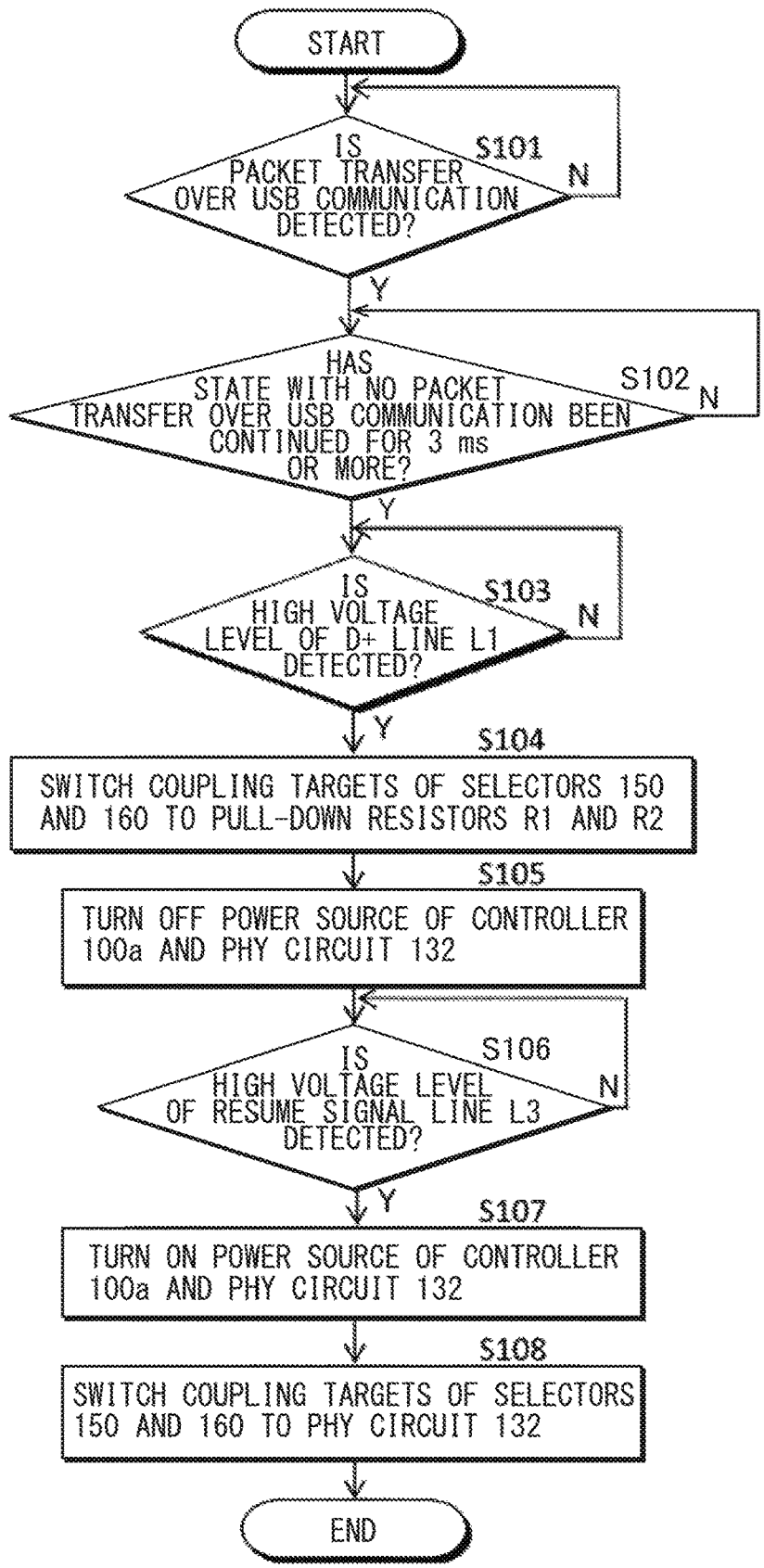
FIG. 5 is a diagram illustrating an example of a procedure of the data transmission.
Figure 6:
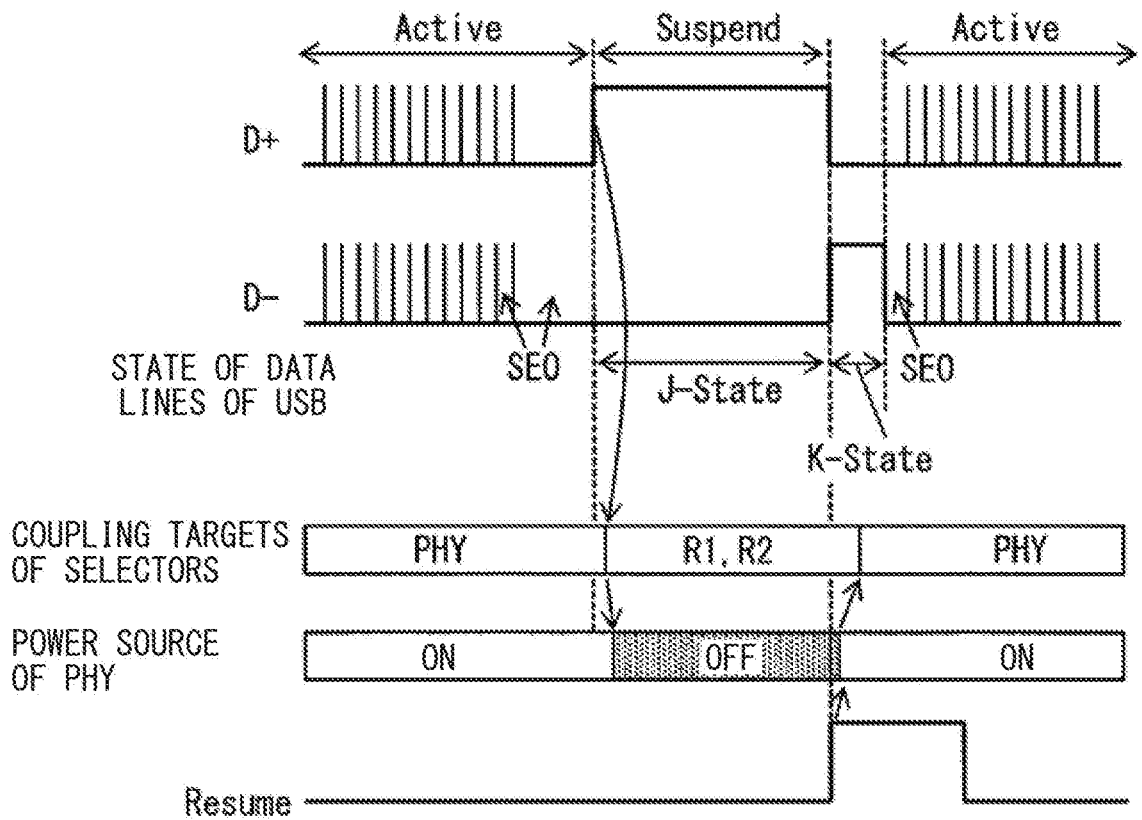
FIG. 6 is a diagram illustrating an example of transition of the waveforms and ON-OFF of a power source in the data transmission.

FIG. 5 illustrates an example of the procedure of the data transmission between the system LSI 100 and the USB device 200. FIG. 6 illustrates an example of transition of waveforms and ON-OFF of the power source in the data transmission illustrated in FIG. 5.

First, the sub CPU 120 may supply, to the controller 100a and the PHY circuit 132, a control signal of turning on the power source. In response thereto, electric power may be supplied to the controller 100a and the PHY circuit 132, activating the controller 100a and the PHY circuit 132.

Thereafter, the sub CPU 120 may supply, to the selector 150, a control signal of selecting the PHY circuit 132 as the coupling target of the D+ line L1 of the data lines of the USB. Further, the sub CPU 120 may supply, to the selector 160, a control signal of selecting the PHY circuit 132 as the coupling target of the D− line L2 of the data lines of the USB. This may cause the D+ line L1 and the D− line L2 of the data lines of the USB to be coupled to the PHY circuit 132 through the selectors 150 and 160, respectively. In this situation, the PHY circuit 132 may be able to detect the voltage levels of the data lines of the USB.

Under the initial state described above, first, the USB device 200 may output the low-level resume signal through the resume signal line L3. The sub CPU 120 may receive the low-level resume signal through the resume signal line L3. On this occasion, the sub CPU 120 may not especially perform any control corresponding to the low-level resume signal with respect to the controller 100a and the PHY circuit 132.

Thereafter, the USB device 200 may start, for example, packet transfer of the USB communication through the data lines of the USB. On this occasion, the controller 100a may determine, on the basis of the voltage levels of the data lines (i.e., the D+ line L1 and the D− line L2) of the USB detected by the PHY circuit 132, whether the packet transfer over the USB communication is being performed (step S101). In a case where the controller 100a determines that the packet transfer over the USB communication is not being performed as a result (S101: N), the controller 100a may continue to determine, on the basis of the voltage levels of the data lines of the USB detected by the PHY circuit 132, whether the packet transfer over the USB communication is being performed.

In a case where the controller 100a determines that the packet transfer over the USB communication is being performed (S101: Y), the controller 100a may determine whether a state (SE0) with no packet transfer over the USB communication has been continued for a predetermined period (step S102). The predetermined period may be, for example but not limited to, 3 ms or more. In a case where the controller 100a determines that the state with no packet transfer over the USB communication has not been continued for the predetermined period (e.g. 3 ms or more) as a result (S102: N), the controller 100a may continue to determine whether the state (SE0) with no packet transfer over the USB communication has been continued for the predetermined period (e.g. 3 ms or more).

In a case where the controller 100a determines that the state with no packet transfer over the USB communication has been continued for the predetermined period (e.g. 3 ms or more) (S102: Y), the controller 100a may determine whether the D+ line L1 of the data lines of the USB has the high voltage level (step S103). In other words, the controller 100a may determine whether the data lines of the USB are in the J-state. In a case where the controller 100a determines that the D+ line L1 of the data lines of the USB does not have the high voltage level as a result (step S103: N), the controller 100a may continue to determine whether the D+ line L1 of the data lines of the USB has the high voltage level.

In a case where the controller 100a determines that the D+ line L1 of the data lines of the USB has the high voltage level (step S103: Y), the controller 100a may supply, to the sub CPU 120, a signal of switching the coupling targets of the selectors 150 and 160 to the pull-down resistors R1 and R2, respectively. Upon receiving such a signal from the controller 100a, the sub CPU 120 may supply, to the selectors 150 and 160, signals of switching the coupling targets of the selectors 150 and 160 to the pull-down resistors R1 and R2, respectively. In response thereto, the selectors 150 and 160 may switch the coupling targets of the selectors 150 and 160 to the pull-down resistors R1 and R2, respectively (step S104). The sub CPU 120 may further supply, to the power source of the controller 100a and the PHY circuit 132, a control signal of turning off the power source. In response thereto, the power source of the controller 100a and the PHY circuit 132 may be deactivated (turned off) (step S105).

While the power source of the controller 100a and the PHY circuit 132 is deactivated, the PHY circuit 132 may not be able to detect the voltage levels of the data lines of the USB. However, the sub CPU 120 may be able to detect the voltage level of the resume signal line L3. The sub CPU 120 may determine whether the resume signal line L3 has the high voltage level $_o$). In other words, the sub CPU 120 may determine whether a control signal indicating that resumption of the USB communication is requested is received from the USB device 200 while the USB suspend mode is enabled.

In a case where the sub CPU 120 determines that the resume signal line L3 does not have the high voltage level as a result (S106: N), the sub CPU 120 may continue to determine whether the resume signal line L3 has the high voltage level. In a case where the sub CPU 120 determines that the resume signal line L3 has the high voltage level (S106: Y), the sub CPU 120 may supply, to the power source of the controller 100a and the PHY circuit 132, a control signal of turning on the power source. In response thereto, the power source of the controller 100a and the PHY circuit 132 may be activated (turned on) (step S107).

The sub CPU 120 may further supply, to the selectors 150 and 160, signals of switching the coupling targets of the selectors 150 and 160 to the PHY circuit 132, respectively. In response thereto, the selectors 150 and 160 may switch the coupling targets of the selectors 150 and 160 to the PHY circuit 132, respectively (step S108). This may allow the PHY circuit 132 to detect the voltage levels of the data lines of the USB.

Thereafter, the USB device 200 may switch the state of the data lines of the USB from the J-state to the K-state, for example. Further, the USB device 200 may start the packet transfer over the USB communication, for example. Thereafter, the USB device 200 may output the low-level resume signal through the resume signal line L3, for example.

According to the example embodiment, the state of the USB device 200 may be thus returned from the USB suspend state to the USB active state.

Example Effects

Next, a description is given of example effects of the data processing apparatus 1000 according to the example embodiment.

According to the example embodiment, the state controller 100b may maintain the USB suspend state with respect to the USB device 200 side of the data lines of the USB while the electric power supply to the PHY circuit 132 is reduced under the power-source setting B. This allows for reduction in the electric power supply to the PHY circuit 132, making it possible to reduce electric power consumption in the standby state by an amount corresponding to an amount of the reduction in the electric power supply to the PHY circuit 132.

Moreover, according to the example embodiment, the PHY circuit 132 may be so controlled that the PHY circuit 132 is brought to the USB active state, when the communication with the USB device 200 is performed under the power-source setting A. Further, the PHY circuit 132 may be so controlled that the PHY circuit 132 is brought to the USB suspend state, when the communication with the USB device 200 is stopped before the switching from the power-source setting A to the power-source setting B is performed. This allows for reduction in the electric power supply to the PHY circuit 132, making it possible to reduce the electric power consumption in the standby state by an amount corresponding to an amount of the reduction in the electric power supply to the PHY circuit 132.

Moreover, according to the example embodiment, the selectors 150 and 160 may be provided. The selector 150 may be configured to selectively couple, to the data line of the USB, the pull-down resistor R1 or both the pull-down resistor R1 and the PHY circuit 132. The selector 160 may be configured to selectively couple, to the data line of the USB, the pull-down resistor R2 or both the pull-down resistor R2 and the PHY circuit 132. This allows for reduction in the electric power supply to the PHY circuit 132, while controlling the voltage levels of the data lines of the USB. As a result, it is possible to reduce the electric power consumption in the standby state by an amount corresponding to an amount of the reduction in the electric power supply to the PHY circuit 132.

Moreover, according to the example embodiment, the selectors 150 and 160 may perform switching from the coupling between the data lines of the USB and the PHY circuit 132 to the coupling between the data lines of the USB and the pull-down resistors R1 and R2 after the PHY circuit 132 is brought to the USB suspend state. Further, the selectors 150 and 160 may perform switching from the coupling between the data lines of the USB and the pull-down resistors R1 and R2 to the coupling between the data lines of the USB and the PHY circuit 132, after the sub CPU 120 performs switching from the power-source setting B to the power-source setting A and the PHY circuit 132 is brought to the USB suspend state. This allows for the reduction in the electric power supply to the PHY circuit 132, while controlling the voltage levels of the data lines of the USB. As a result, it is possible to reduce the electric power consumption in the standby state by an amount corresponding to an amount of the reduction in the electric power supply to the PHY circuit 132.

Moreover, according to the example embodiment, when it is required for the USB device 200 to perform communication with the PHY circuit 132 in the state under the power-source setting B, the GPIO 140 and the sub CPU 120 may perform switching from the power-source setting B to the power-source setting A. Further, after the switching to the power-source setting A is performed and the PHY circuit 132 is brought to the USB suspend state, switching from the coupling between the data lines of the USB and the pull-down resistors R1 and R2 to the coupling between the data lines of the USB and the PHY circuit 132 may be performed. This allows for the reduction in the electric power supply to the PHY circuit 132, while controlling the voltage levels of the data lines of the USB. As a result, it is possible to reduce the electric power consumption in the standby state by an amount corresponding to an amount of the reduction in the electric power supply to the PHY circuit 132.

Moreover, according to the example embodiment, after the GPIO 140 performs the switching from the state under the power-source setting B to the state under the power-source setting A, the communication with the USB device 200 may be performed through the data lines of the USB and the PHY circuit 132 under the power-source setting A. This allows a return from the USB suspend state to the USB active state by means of the GPIO 140 and the sub CPU 120 even in a case where the PHY circuit 132 is not able to detect the resume request.

Moreover, according to the example embodiment, the data lines of the USB may be brought to the communication state the same as that of the PHY circuit 132, i.e., the USB suspend state, after the switching from the power-source setting B to the power-source setting A is performed and the PHY circuit 132 is brought to the USB suspend state. This contributes to preventing the voltage levels of the data lines of the USB from being indefinite upon the return from the USB suspend state to the USB active state.

3. Modifications

Next, a description is given of modifications of the data processing apparatus 1000 according to the example embodiment.

Modification A

According to the example embodiment, the resume signal line L3 may be provided between the system LSI 100 and the USB device 200 in addition to the data lines of the USB. The resume signal may be supplied from the USB device 200 to the system LSI 100 through the resume signal line L3, thereby notifying the system LSI 100 that the data lines of the USB are in the K-state. However, this is non-limiting. The notification, with respect to the system LSI 100, that the data lines of the USB are in the K-state may be achieved by a method different from that according to the example embodiment.

Figure 7:
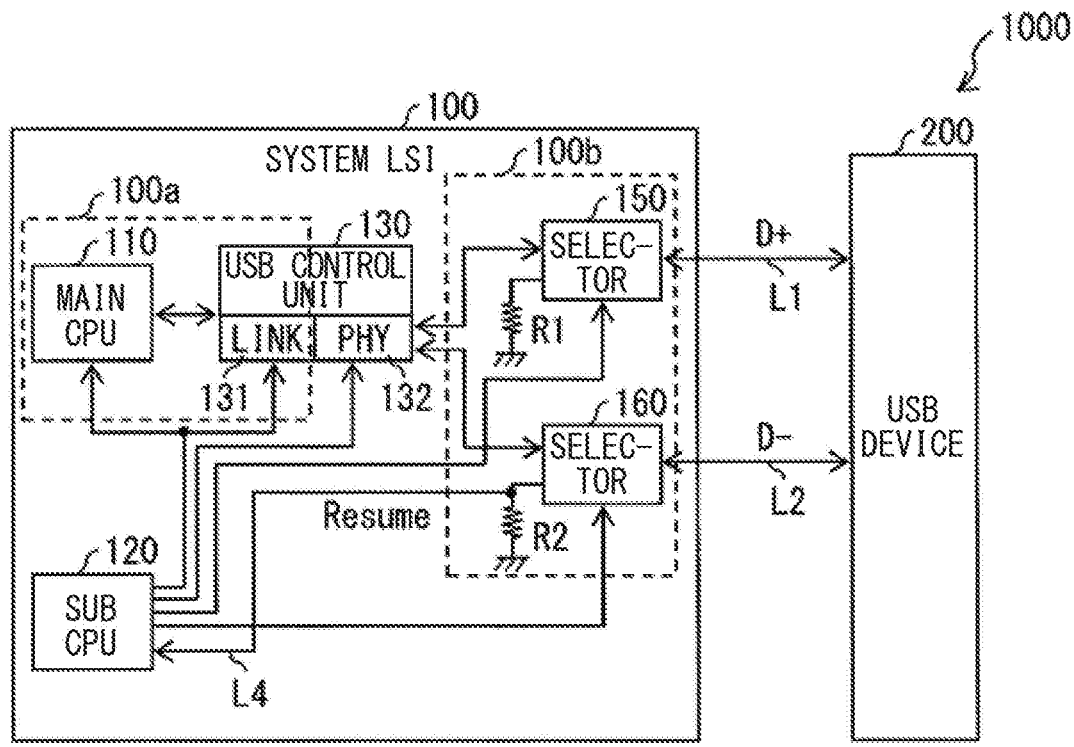
FIG. 7 is a diagram illustrating a modification of the schematic configuration of the data processing apparatus.

FIG. 7 illustrates a modification (Modification A) of the schematic configuration of the data processing apparatus 1000 according to the example embodiment. According to Modification A, the resume signal line L3 and the GPIO 140 may be omitted, and a control signal line L4 may be provided in the system LSI 100. The control signal line L4 may be coupled to one end of the pull-down resistor R2 (i.e., an end on the selector 160 side) and to the sub CPU 120. That is, the system LSI 100 and the USB device 200 may be coupled to each other only through the data lines (i.e., the D+ line L1 and the D− line L2) of the USB, according to Modification A.

According to Modification A, the sub CPU 120 may perform the selection control of the selectors 150 and 160 and the power source control of the controller 100a and the PHY circuit 132 on the basis of a voltage applied to the pull-down resistor R2 while the USB suspend mode is enabled. That is, the voltage applied to the pull-down resistor R2 may be supplied to the sub CPU 120 as the resume signal, according to Modification A.

Figure 8:
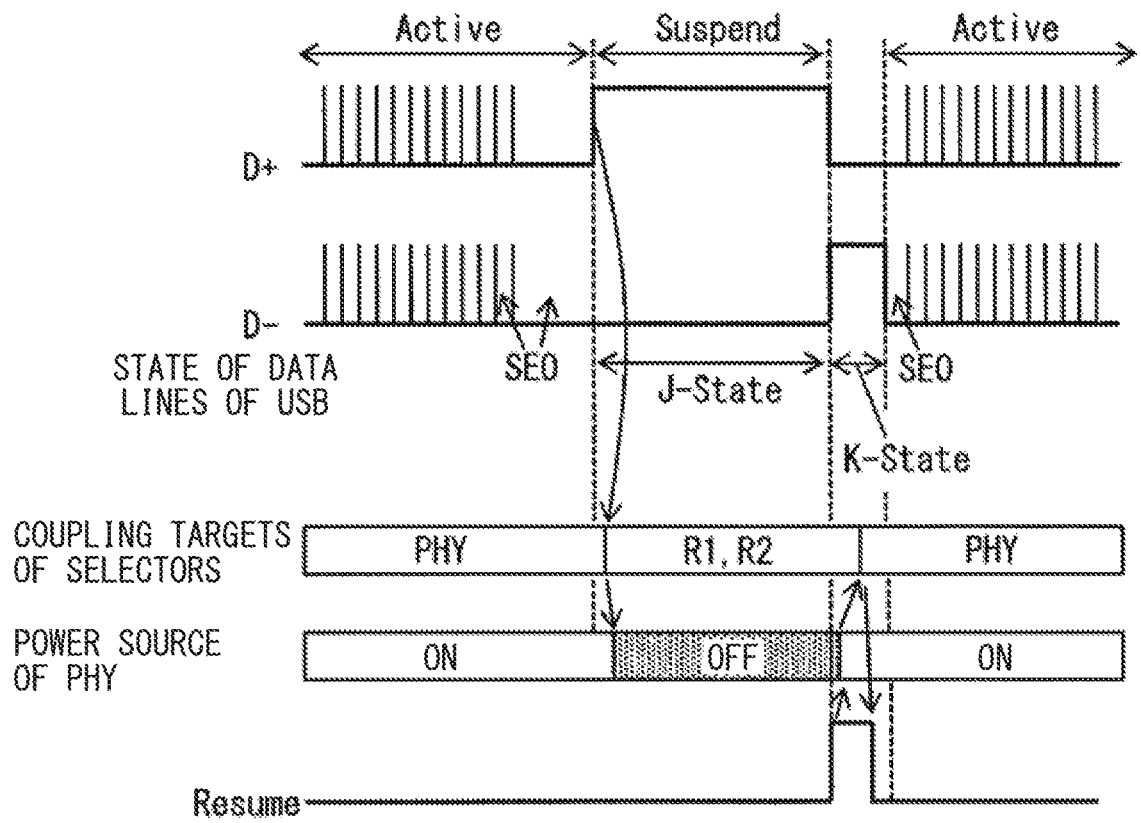
FIG. 8 is a diagram illustrating an example of the transition of the waveforms and the ON-OFF of the power source in the data transmission.

FIG. 8 illustrates an example of transition of the waveforms and the ON-OFF of the power source in the data transmission between the system LSI 100 and the USB device 200 according to Modification A. Note that a procedure of the data transmission in a period from activation of the power source of the controller 100a and the PHY circuit 132 to deactivation of the power source according to Modification A may be similar to that according to the example embodiment. Therefore, in the following, a procedure of the data transmission after the deactivation of the power source of the controller 100a and the PHY circuit 132 is described.

While the power source of the controller 100a and the PHY circuit 132 is deactivated, the PHY circuit 132 may not be able to detect the voltage levels of the data lines of the USB. However, the sub CPU 120 may be able to detect a voltage level of the control signal line L4, i.e., the voltage level applied to the pull-down resistor R2. The sub CPU 120 may determine whether the control signal line L4 has the high voltage level, i.e., whether the resume signal has the high signal level (step S106). In other words, the sub CPU 120 may determine whether the control signal, which indicates that the resumption of the USB communication is requested, is received from the USB device 200 while the USB suspend mode is enabled.

In a case where the sub CPU 120 determines that the control signal line L4 does not have the high voltage level, i.e., that the resume signal does not have the high voltage level, as a result (S106: N), the sub CPU 120 may continue to determine whether the control signal line L4 has the high voltage level, i.e., whether the resume signal has the high signal level. In a case where the sub CPU 120 determines that the control signal line L4 has the high voltage level, i.e., that the resume signal has the high signal level (S106: Y), the sub CPU 120 may supply, to the power source of the controller 100a and the PHY circuit 132, the control signal of turning on the power source. In response thereto, the power source of the controller 100a and the PHY circuit 132 may be activated (turned on) (step S107).

The sub CPU 120 may further supply, to the selectors 150 and 160, the signals of switching the coupling targets of the selectors 150 and 160 to the PHY circuit 132, respectively. In response thereto, the selectors 150 and 160 may switch the coupling targets of the selectors 150 and 160 to the PHY circuit 132, respectively (step S108). This may allow the PHY circuit 132 to detect the voltage levels of the data lines of the USB.

Thereafter, the USB device 200 may switch the state of the data lines of the USB from the J-state to the K-state, for example. Further, the USB device 200 may start the packet transfer over the USB communication, for example. According to Modification A, the state of the USB device 200 may be thus returned from the USB suspend state to the USB active state.

Next, a description is given of example effects of the data processing apparatus 1000 according to Modification A.

According to Modification A, the state controller 100b may maintain the USB suspend state with respect to the USB device 200 side of the data lines of the USB while the electric power supply to the PHY circuit 132 is reduced under the power-source setting B, as with the example embodiment. This allows for reduction in the electric power supply to the PHY circuit 132, making it possible to reduce the electric power consumption in the standby state by an amount corresponding to an amount of the reduction in the electric power supply to the PHY circuit 132.

Moreover, according to Modification A, the system LSI 100 and the USB device 200 may be coupled to each other only through the data lines (i.e., the D+ line L1 and the D− line L2) of the USB. This contributes to reduction in the number of terminals coupling the system LSI 100 and the USB device 200 to each other, compared with the example embodiment. Further, because it is not necessary to provide the USB device 200 with a function of outputting the resume signal to the resume signal line L3, it is possible to improve versatility of the USB device 200.

Modification B

Figure 9:
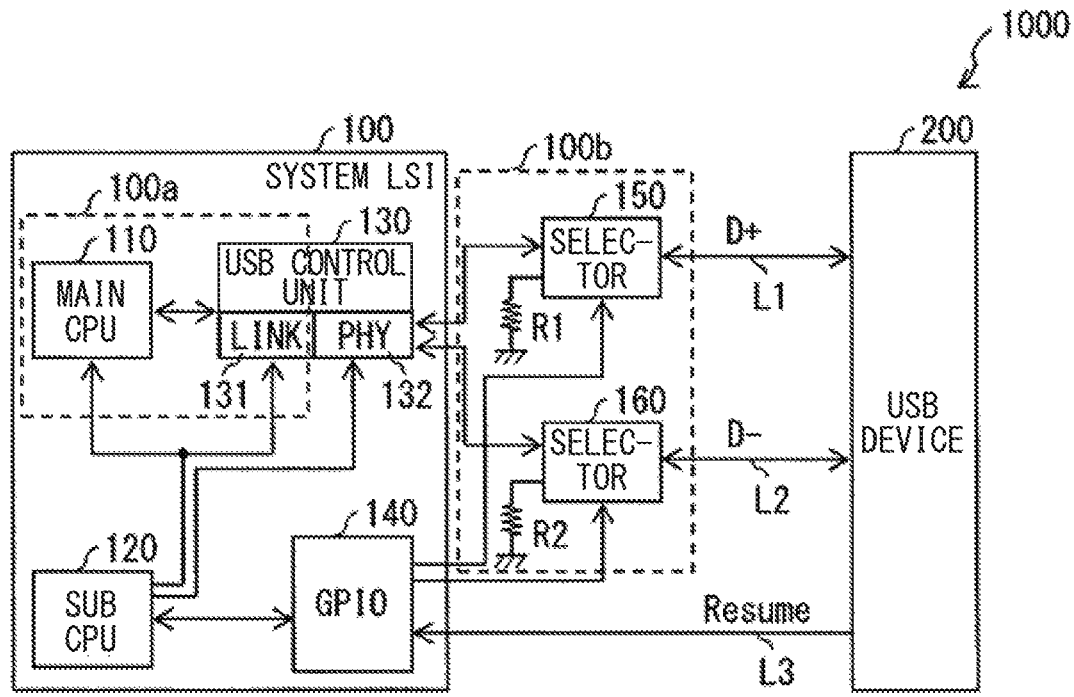
FIG. 9 is a diagram illustrating another modification of the schematic configuration of the data processing apparatus.
Figure 10:
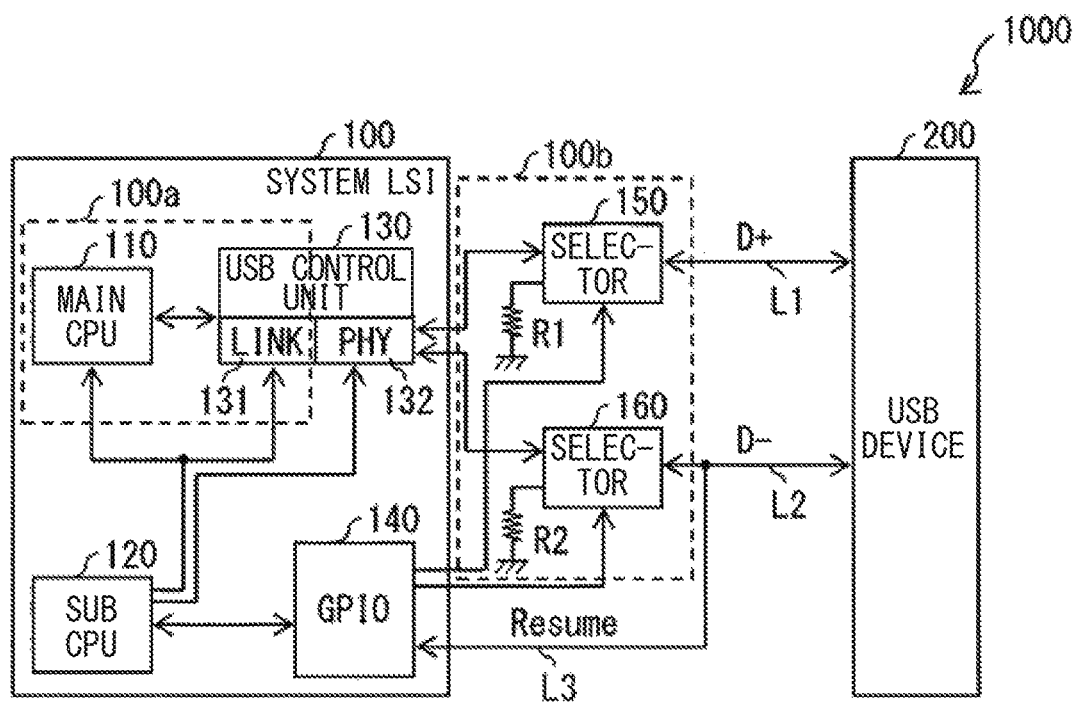
FIG. 10 is a diagram illustrating still another modification of the schematic configuration of the data processing apparatus.
Figure 11:
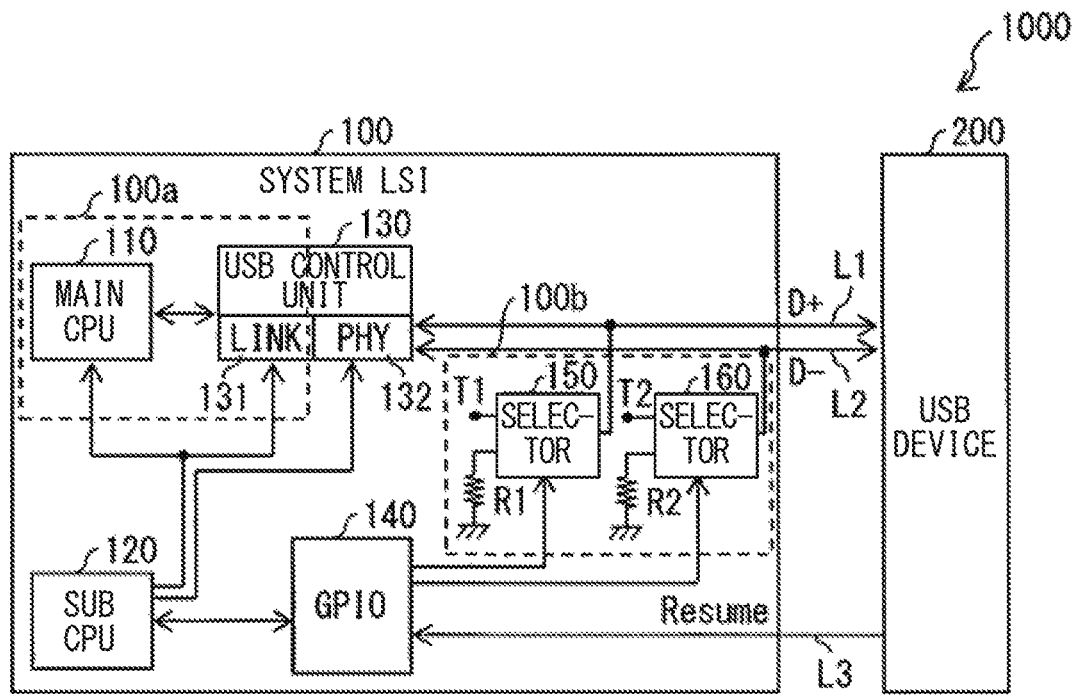
FIG. 11 is a diagram illustrating still another modification of the schematic configuration of the data processing apparatus.
Figure 12:
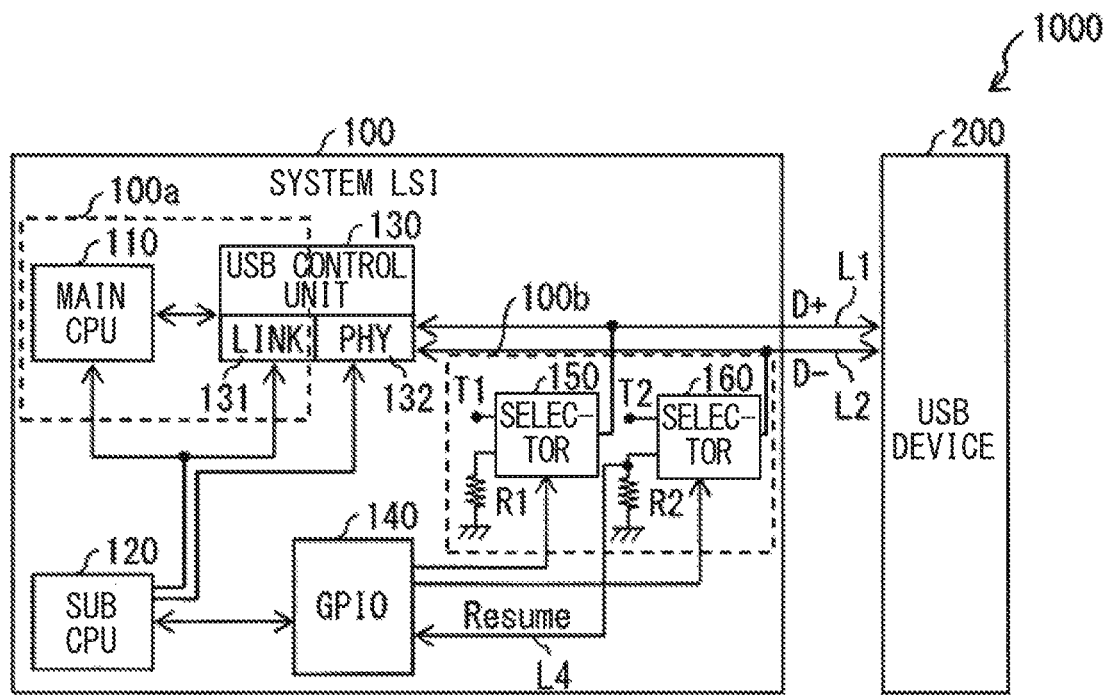
FIG. 12 is a diagram illustrating still another modification of the schematic configuration of the data processing apparatus.
Figure 13:
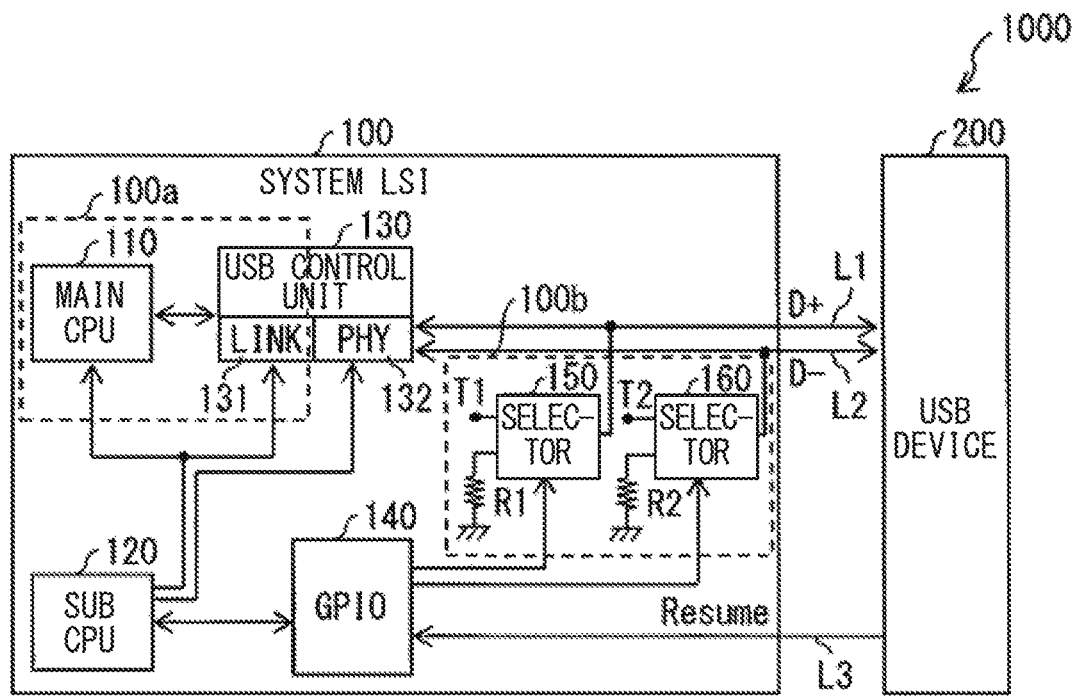
FIG. 13 is a diagram illustrating still another modification of the schematic configuration of the data processing apparatus.
Figure 14:
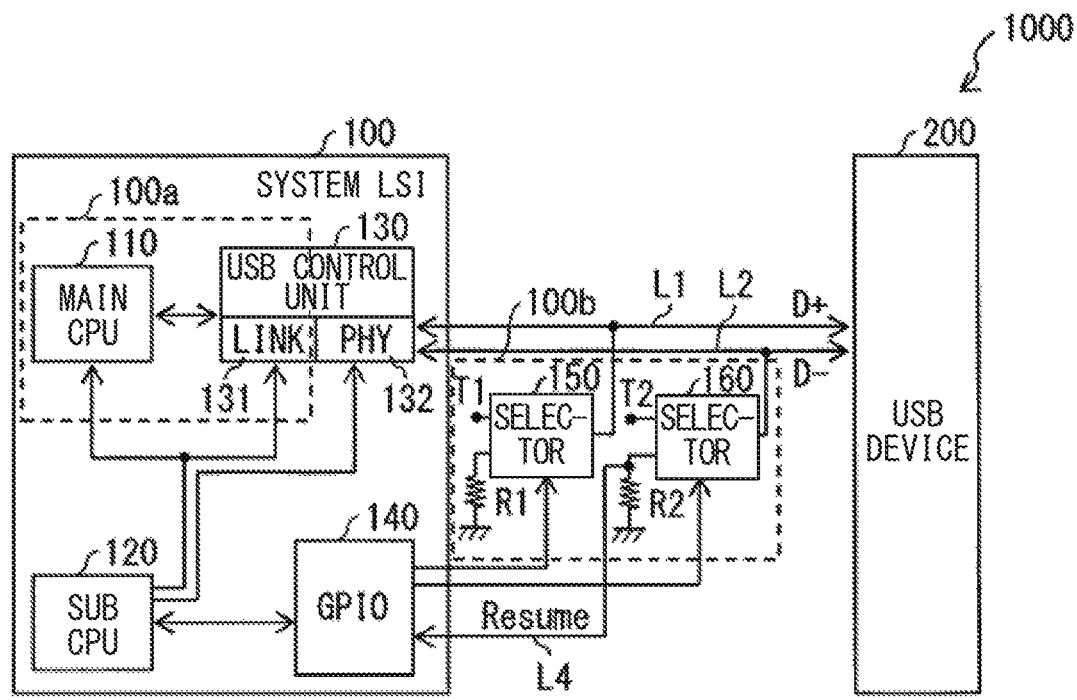
FIG. 14 is a diagram illustrating still another modification of the schematic configuration of the data processing apparatus.

According to the example embodiment and the modification thereof, the selectors 150 and 160 and the pull-down resistors R1 and R2 may be provided in the system LSI 100; however, this is non-limiting. In one example (Modification B) of the example embodiment and the modification thereof, as illustrated in FIGS. 9 and 10, the selectors 150 and 160 and the pull-down resistors R1 and R2 may be provided outside the system LSI 100. It is possible to obtain effects similar to those in the example embodiment and the modification thereof also in this case.

Modification C

According to the example embodiment and the modifications thereof, the selectors 150 and 160 may be inserted in the respective data lines of the USB; however, this is non-limiting. In one example (Modification C) of the example embodiment and the modification thereof, as illustrated in FIGS. 11 to 14, the selector 150 may be coupled in parallel to the D+ line L1 of the data lines of the USB, and the selector 160 may be coupled in parallel to the D− line L2 of the data lines of the USB.

In this case, the PHY circuit 132 may be coupled to the data lines of the USB. The selectors 150 and 160 may perform coupling and decoupling between the data lines of the USB and the pull-down resistors R1 and R2, respectively. The selectors 150 and 160 may perform, after the PHY circuit 132 is brought to the USB suspend state, switching from decoupling between the data lines of the USB and the pull-down resistors R1 and R2 to coupling between the data lines of the USB and the pull-down resistors R1 and R2, respectively. After the sub CPU 120 performs switching from the power-source setting B to the power-source setting A, and the PHY circuit 132 is brought to the USB suspend state, the selectors 150 and 160 may perform switching from decoupling between the data lines of the USB and the pull-down resistors R1 and R2 to coupling between the data lines of the USB and the PHY circuit 132.

The selector 150 may be a switch module that selects one of an open terminal T1 and the pull-down resistor R1 as the coupling target of the D+ line L1 of the data lines of the USB. The selector 160 may be a switch module that selects one of an open terminal T2 and the pull-down resistor R2 as the coupling target of the D− line L2 of the data lines of the USB.

In a case where the selector 150 selects the open terminal T1, the D+ line L1 of the data lines of the USB and the open terminal T1 may be electrically coupled to each other. In a case where the selector 150 selects the pull-down resistor R1, each of the pull-down resistor R1 and the PHY circuit 132 may be coupled in parallel to the D+ line L1 of the data lines of the USB. In a case where the selector 160 selects the open terminal T2, the D− line L2 of the data lines of the USB and the open terminal T2 may be electrically coupled to each other. In a case where the selector 160 selects the pull-down resistor R2, each of the pull-down resistor R2 and the PHY circuit 132 may be coupled in parallel to the D− line L2 of the data lines of the USB.

As described above, according to Modification C, the selector 150 may be coupled in parallel to the D+ line L1 of the data lines of the USB, and the selector 160 may be coupled in parallel to the D− line L2 of the data lines of the USB. This reduces or eliminates a possibility that the voltage levels of the data lines of the USB detected by the PHY circuit 132 is indefinite upon the switching performed by the selectors 150 and 160.

4. Application Example

Figure 15:
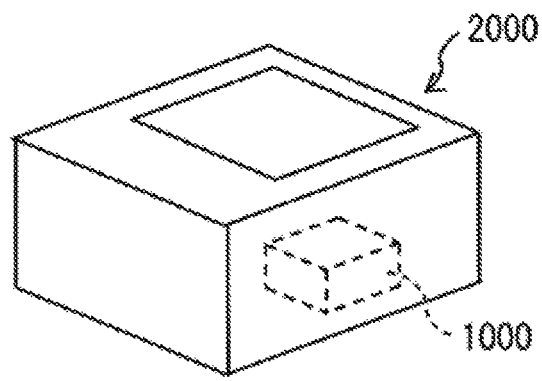
FIG. 15 is a diagram illustrating an application example of the data processing apparatus.

FIG. 15 illustrates an application example of the data processing apparatus 1000 according to the example embodiment and the modifications thereof. An image forming apparatus 2000 may include the data processing apparatus 1000 according to any of the example embodiment and the modifications thereof. Non-limiting examples of the image forming apparatus 2000 may include a printer, a scanner, and a multi-function peripheral. Thus providing the image forming apparatus 2000 with the data processing apparatus 1000 according to any of the example embodiment and the modifications thereof makes it possible to reduce electric power consumption in a standby state.

The present disclosure has been described above referring to the example embodiment, the modifications, and the application example; however, the technology is not limited to the example embodiment, the modifications, and the application example described above, and other modifications may be made in variety of ways. Note that the effects described herein are mere examples. The effects of the technology are not limited to those described herein. The technology may achieve any effect other than those described herein.

Furthermore, the technology encompasses any possible combination of some or all of the various embodiments and the modifications described herein and incorporated herein. It is possible to achieve at least the following configurations from the above-described example embodiments of the technology.

(1)

A data processing apparatus including:
a power-source controller that controls a first power-source setting and a second power-source setting, the second power-source setting causing less electric power consumption than the first power-source setting;
a data processing device;
a physical-layer section that is brought to a first communication state when communication with the data processing device is performed under the first power-source setting, the physical-layer section being brought to a second communication state before switching from the first power-source setting to the second power-source setting is performed, the second communication state causing the communication with the data processing device to be stopped;
a communication controller that performs the communication with the data processing device through a predetermined communication path and the physical-layer section under the first power-source setting, the communication controller stopping the communication with the data processing device through the communication path and the physical-layer section under the second power-source setting; and
a state controller that maintains the second communication state with respect to the data processing device side of the communication path while electric power supply to the physical-layer section is reduced under the second power-source setting.

(2)

The data processing apparatus according to (1), in which
the communication controller controls the physical-layer section and thereby bring the physical-layer section to the first communication state, upon performing the communication with the data processing device under the first power-source setting, and
the communication controller controls the physical-layer section and thereby bring the physical-layer section to the second communication state, upon stopping the communication with the data processing device before the switching from the first power-source setting to the second power-source setting is performed.

(3)

The data processing apparatus according to (1) or (2), in which the state controller includes
a resistor that provides a predetermined resistance component, and
a switch section that selectively couples the resistor and the physical-layer section to the communication path.

(4)

The data processing apparatus according to (3), in which
the switch section performs, after the physical-layer section is brought to the second communication state, switching from coupling between the communication path and the physical-layer section to coupling between the communication path and the resistor, and
the power-source controller reduces, after the switching to the coupling between the communication path and the resistor is performed, the electric power supply to the physical-layer section as the second power-source setting.

(5)

The data processing apparatus according to claim 4, further including
a state-signal input section that performs switching from a state under the second power-source setting to a state under the first power-source setting when the data processing device requires the communication with the physical-layer section in the state under the second power-source setting, in which
the switch section performs, after the power-source controller performs the switching from the second power-source setting to the first power-source setting and the physical-layer section is brought to the second communication state, switching from the coupling between the communication path and the resistor to the coupling between the communication path and the physical-layer section.

(6)

The data processing apparatus according to (1) or (2), in which the physical-layer section is coupled to the communication path, and the state controller includes a resistor that provides a predetermined resistance component, and a switch section that performs coupling and decoupling between the communication path and the resistor.

(7)

The data processing apparatus according to (6), in which the switch section performs, after the physical-layer section is brought to the second communication state, switching from the decoupling between the communication path and the resistor to the coupling between the communication path and the resistor, and the power-source controller reduces, after the switching to the coupling between the communication path and the resistor is performed, the electric power supply to the physical-layer section as the second power-source setting.

(8)

The data processing apparatus according to (7), further including a state-signal input section that performs switching from a state under the second power-source setting to a state under the first power-source setting when the data processing device requires the communication with the physical-layer section in the state under the second power-source setting, in which the switch section performs, after the power-source controller performs the switching from the second power-source setting to the first power-source setting and the physical-layer section is brought to the second communication state, switching from the decoupling between the communication path and the resistor to the coupling between the communication path and the resistor.

(9)

The data processing apparatus according to (5) or (8), in which the communication controller performs, after the state-signal input section performs the switching from the state under the second power-source setting to the state under the first power-source setting, the communication with the data processing device through the communication path and the physical-layer section under the first power-source setting.

(10)

The data processing apparatus according to any one of (1) to (9), in which the state controller brings, after the switching from the second power-source setting to the first power-source setting is performed and the physical-layer section is brought to the second communication state, the communication path to the second communication state same as a communication of the physical-layer section.

(11)

A data processing apparatus including:

a power-source controller that controls a first power-source setting and a second power-source setting, the second power-source setting causing less electric power consumption than the first power-source setting;

a physical-layer section that is brought to a first communication state when communication with a data processing device is performed under the first power-source setting, the physical-layer section being brought to a second communication state before switching from the first power-source setting to the second power-source setting is performed, the second communication state causing the communication with the data processing device to be stopped;

a communication controller that performs the communication with the data processing device through a predetermined communication path and the physical-layer section under the first power-source setting, the communication controller stopping the communication with the data processing device through the communication path and the physical-layer section under the second power-source setting; and a state controller that maintains the second communication state with respect to the data processing device side of the communication path while electric power supply to the physical-layer section is reduced under the second power-source setting.

According to the data processing apparatus of the embodiment of the technology, it is possible to further reduce electric power consumption in a standby state.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A data processing apparatus comprising:

a power-source controller that controls a first power-source setting and a second power-source setting, the second power-source setting causing less electric power consumption than the first power-source setting;

a data processing device;

a physical-layer section that is brought to a first communication state when communication with the data processing device is performed under the first power-source setting, the physical-layer section being brought to a second communication state before switching from the first power-source setting to the second power-source setting is performed, the second communication state causing the communication with the data processing device to be stopped;

a communication controller that performs the communication with the data processing device through a predetermined communication path and the physical-layer section under the first power-source setting, the communication controller stopping the communication with the data processing device through the communication path and the physical-layer section under the second power-source setting; and a state controller that maintains the second communication state with respect to the data processing device side of the communication path while electric power supply to the physical-layer section is reduced under the second power-source setting, wherein the predetermined communication path has a data line of a universal serial bus, the data line including a D+ line and a D− line that perform reception and transmission of a differential signal, the communication controller is configured to control the physical-layer section, to thereby bring the physical-layer section to the first communication state, upon performing the communication with the data processing device under the first power-source setting, and bring the physical-layer section to the second communication state, upon stopping the communication with the data processing device before the switching from the first power-source setting to the second power-source setting is performed, the state controller includes a first resistor and a second resistor each comprising a pull-down resistor that provides a predetermined resistance component, a first switch section that selectively couples the first resistor and the physical-layer section to the D+ line, and a second switch section that selectively couples the second resistor and the physical-layer section to the D− line, the first switch section being configured to perform a first switching that switches from coupling between the physical-layer section and the D+ line to coupling between the first resistor and the D+ line, and the second switch section being configured to perform a second switching that switches from coupling between the physical-layer section and the D− line to coupling between the second resistor and the D− line, responsive to the physical-layer section being brought to the second communication state, in response to outputting of a Hi level signal from the data processing device to the D+ line and outputting of a Lo level signal from the data processing device to the D− line, from a state in which a signal level of the D+ line and a signal level of the D− line are both at the Lo level when the physical-layer section is in the first communication state, and the power-source controller switches from the first power-source setting to the second power-source setting by reducing the electric power supply to the physical-layer section, after the first switching and the second switching are performed.

2. The data processing apparatus according to claim 1, further comprising a receiver that receives, from the data processing device, a request signal that requests switching from a state under the second power-source setting to a state under the first power-source setting when the data processing device requires the communication with the physical-layer section in the state under the second power-source setting, wherein the power-source controller switches from the second power-source setting to the first power-source setting in response to outputting of the Lo level signal from the data processing device to the D+ line and outputting of the Hi level signal from the data processing device to the D− line and in response to the reception of the request signal by the receiver from the data processing device when the physical-layer section is in the second communication state, the first switch section performs, after the power-source controller performs the switching from the second power-source setting to the first power-source setting and the physical-layer section is brought to the first communication state, switching from the coupling between the first resistor and the D+ line to the coupling between the physical-layer section and the D+ line, and the second switch section performs, after the power-source controller performs the switching from the second power-source setting to the first power-source setting and the physical-layer section is brought to the first communication state, switching from the coupling between the second resistor and the D− line to the coupling between the physical-layer section and the D− line.

3. A data processing apparatus, comprising:

a power-source controller that controls a first power-source setting and a second power-source setting, the second power-source setting causing less electric power consumption than the first power-source setting;

a data processing device;

a physical-layer section that is brought to a first communication state when communication with the data processing device is performed under the first power-source setting, the physical-layer section being brought to a second communication state before switching from the first power-source setting to the second power-source setting is performed, the second communication state causing the communication with the data processing device to be stopped;

a communication controller that performs the communication with the data processing device through a predetermined communication path and the physical-layer section under the first power-source setting, the communication controller stopping the communication with the data processing device through the communication path and the physical-layer section under the second power-source setting; and a state controller that maintains the second communication state with respect to the data processing device side of the communication path while electric power supply to the physical-layer section is reduced under the second power-source setting, wherein the predetermined communication path has a data line of a universal serial bus, the data line including a D+ line and a D− line that perform reception and transmission of a differential signal, the physical-layer section is coupled to the D+ line and the D− line, the communication controller is configured to control the physical-layer section to thereby bring the physical-layer section to the first communication state, upon performing the communication with the data processing device under the first power-source setting, and bring the physical-layer section to the second communication state, upon stopping the communication with the data processing device before the switching from the first power-source setting to the second power-source setting is performed, the state controller includes a first resistor and a second resistor each comprising a pull-down resistor that provides a predetermined resistance component, and a first switch section that performs coupling and decoupling between the D+ line and the first resistor, and a second switch section that performs coupling and decoupling between the D− line and the second resistor, the first switch section being configured to perform a first coupling that couples the D+ line and the first resistor, and the second switch section being configured to perform a second coupling that couples the D− line and the second resistor, responsive to the physical-layer section being brought to the second communication state, in response to outputting of a Hi level signal from the data processing device to the D+ line and outputting of a Lo level signal from the data processing device to the D− line from a state in which a signal level of the D+ line and a signal level of the D− line are both at the Lo level when the physical-layer section is in the first communication state, and the power-source controller switches from the first power-source setting to the second power-source setting by reducing the electric power supply to the physical-layer section, after the first coupling and the second coupling are performed.

4. The data processing apparatus according to claim 3, further comprising a receiver that receives, from the data processing device, a request signal that requests switching from a state under the second power-source setting to a state under the first power-source setting when the data processing device requires the communication with the physical-layer section in the state under the second power-source setting, wherein the power-source controller switches from the second power-source setting to the first power-source setting in response to outputting of the Lo level signal from the data processing device to the D+ line and outputting of the Hi level signal from the data processing device to the D− line, and in response to the reception of the request signal by the receiver from the data processing device when the physical-layer section is in the second communication state, the first switch section decouples, after the power-source controller performs the switching from the second power-source setting to the first power-source setting and the physical-layer section is brought to the first communication state, the coupling between the D+ line communication path and the first resistor, and the second switch section decouples, after the power-source controller performs the switching from the second power-source setting to the first power-source setting and the physical-layer section is brought to the first communication state, the coupling between the second resistor and the D− line.

5. The data processing apparatus according to claim 2, wherein the communication controller performs, after the switching from the state under the second power-source setting to the state under the first power-source setting is performed in response to the request signal received by the receiver, the communication with the data processing device through the D+ line, the D− line, and the physical-layer section under the first power-source setting.

6. The data processing apparatus according to claim 4, wherein the communication controller performs, after the switching from the state under the second power-source setting to the state under the first power-source setting is performed in response to the request signal received by the receiver, the communication with the data processing device through the D+ line, the D− line, and the physical-layer section under the first power-source setting.

7. The data processing apparatus according to claim 1, wherein the first resistor and the second resistor are coupled to a ground line.

8. The data processing apparatus according to claim 3, wherein the first resistor and the second resistor are coupled to a ground line.

* * * * *